United States Patent
Fiutak et al.

(10) Patent No.: US 12,485,652 B2
(45) Date of Patent: Dec. 2, 2025

(54) REINFORCED LAMINATED SUPPORT MAT WITH RESILIENT CORNER MEMBER

(71) Applicant: Anthony Hardwood Composites, Inc., Sheridan, AR (US)

(72) Inventors: Jon C. Fiutak, Cape Elizabeth, ME (US); Toby Q. Edwards, Bryant, AR (US); James F. Weber, Jr., Eugene, OR (US)

(73) Assignee: Anthony Hardwood Composites, Inc., Sheridan, AR (US)

( * ) Notice: Subject to any disclaimer, the term of this patent is extended or adjusted under 35 U.S.C. 154(b) by 194 days.

(21) Appl. No.: 18/398,435

(22) Filed: Dec. 28, 2023

(65) Prior Publication Data

US 2025/0144920 A1    May 8, 2025

Related U.S. Application Data

(60) Provisional application No. 63/547,188, filed on Nov. 3, 2023, provisional application No. 63/547,032, filed on Nov. 2, 2023.

(51) Int. Cl.
| | |
|---|---|
| *B32B 21/04* | (2006.01) |
| *B32B 3/08* | (2006.01) |
| *B32B 3/28* | (2006.01) |
| *B32B 7/08* | (2019.01) |
| *B32B 7/12* | (2006.01) |
| *B32B 25/16* | (2006.01) |

(Continued)

(52) U.S. Cl.
CPC .............. *B32B 21/042* (2013.01); *B32B 3/08* (2013.01); *B32B 3/28* (2013.01); *B32B 7/08* (2013.01); *B32B 7/12* (2013.01); *B32B 21/045* (2013.01); *B32B 25/16* (2013.01); *B32B 2471/04* (2013.01)

(58) Field of Classification Search
CPC ... E01C 9/086; E04C 2/14; E04C 3/10; B32B 21/042; B32B 3/08; B32B 7/08; B32B 21/045
See application file for complete search history.

(56) References Cited

U.S. PATENT DOCUMENTS

| | | | |
|---|---|---|---|
| 4,932,198 A | 6/1990 | Eisenhauer et al. | |
| 6,214,428 B1 * | 4/2001 | Henderson | B27M 3/0046 238/14 |
| 7,137,236 B2 | 11/2006 | Brownlie et al. | |

(Continued)

*Primary Examiner* — Joanna Pleszczynska
(74) *Attorney, Agent, or Firm* — MacMillan, Sobanski & Todd, LLC

(57) ABSTRACT

A reinforced support mat includes a plurality of vertically oriented individual wood members adhesively bonded to each other, and having wide faces oriented parallel to a direction of an applied load. A plurality of corrugated protective edge members is positioned against, and attached to, each opposing wide face of the reinforced support mat, and a resilient belting corner member is mounted to opposing wide face of the reinforced support mat adjacent the longitudinal ends of the corrugated protective edge members. A plurality of rigid fasteners extending through and connecting pairs of the corrugated protective edge members on opposite sides of the reinforced support mat, and inboard ends of pairs of the resilient edge members, to the wide faces of the support mat. A lag bolt attaches an outboard end of each resilient belting corner member to a wide face of the support mat.

8 Claims, 6 Drawing Sheets

(51) Int. Cl.
*E01C 9/08* (2006.01)
*E04C 2/14* (2006.01)

(56) References Cited

U.S. PATENT DOCUMENTS

| | | | |
|---|---|---|---|
| 7,818,929 B2 | 10/2010 | Fiutak et al. | |
| 8,906,480 B2 | 12/2014 | Fiutak et al. | |
| 9,447,548 B2* | 9/2016 | Penland, Jr. | E01C 5/20 |
| 2009/0152523 A1* | 6/2009 | Erwin | E04H 17/1602 |
| | | | 256/24 |
| 2016/0186386 A1* | 6/2016 | Althaus | E02D 27/44 |
| | | | 428/182 |
| 2018/0170614 A1* | 6/2018 | Sun | F16F 15/08 |

* cited by examiner

REINFORCED LAMINATED SUPPORT MAT WITH RESILIENT CORNER MEMBER

BACKGROUND OF THE INVENTION

This invention relates in general to a laminated support mat. In particular, this invention relates to embodiments of an improved reinforced laminated support mat.

The construction industry utilizes solid sawn wood and wood panel members in a variety of forms to aid in the erection of buildings, roads, and bridges. For example, temporary road panels and crane mats are often constructed using solid-sawn hardwood timbers or some species of softwoods. These panels are used to form a temporary lightweight roadway or foundation to facilitate vehicular and equipment travel as may be required in construction operations. Other industry users of such mats include users in the field of pipeline, utility, transportation, oil, and infrastructure.

As shown in FIG. 1, a conventional road panel, shown generally at 10, is formed by using a plurality of solid sawn timber elements 12. Typically, four pieces of solid sawn timber 12 are used, each having a cross-sectional dimension ranging from about 8 inches by 8 inches to about 12 inches by 12 inches, with a length of 16 feet. The four pieces of timber 12 are usually bolted together using bolts 14 to form the temporary road panel 10 having an assembled dimension of 4 feet by 1 foot by 16 feet. Several panels may be placed side by side over existing ground to form a temporary roadway or to support cranes on a construction site. Ground conditions under the panels vary greatly and may include, for example, sand, clay, wetlands, and possibly a considerable amount of water. Another conventional wood mat utilizes smaller dimensional lumber and utilizes nails, carriage bolts, or steel rods as a fastening system. All of these systems have mechanical fastening systems to transfer stresses between components. Additionally, U.S. Pat. No. 4,932,198 discloses a compound timber-metal stressed deck with metal plates inserted between the timbers.

The hardwood panels are typically discarded at the end of the construction project, or they may be re-used if they are in relatively good condition. The longevity of the panels may be as little as six months to one year, depending on the length of the construction project and the environmental conditions to which the panels are subjected. The wood panels are typically untreated with preservative chemicals because of environmental concerns. Hardwoods are typically used because of their superior wear resistance to heavy truck and other construction equipment traffic. In addition to road panels and crane mats, other applications for the hardwood panels include decks over steel girders for temporary bridges, and soldier piles.

Support mats are known to deflect or bend when a load is applied to an upper or load-bearing surface of the support mat. The vertical distance (perpendicular to the length of the wood members used in the support mat) that a support mat deflects will vary with the length of the support mat and the distribution of the load applied to the load-bearing surface of the support mat. A mat having a length of about 14 feet and a width of about 8 feet may, for example, deflect within the range of from about 2 inches to about 4 inches, although a mat may deflect less than 2 inches or more than 4 inches. Upon removal of the applied load, the support mat will return to a substantially planar shape.

Some support mats may be reinforced with steel or other metal beams. U.S. Pat. No. 8,906,480 discloses one such reinforced laminated support mat.

However, steel reinforcement member of reinforced laminated support mats may become damaged, such as by being bent, when in use with one or more of an additional reinforced laminated support mat. Therefore, it would be desirable to provide improved steel reinforcement for a reinforced laminated support mat for supporting heavy equipment.

SUMMARY OF THE INVENTION

The present application describes various embodiments of a reinforced support mat. One embodiment, the reinforced support mat includes a plurality of vertically oriented individual wood members adhesively bonded to each other, and having wide faces oriented parallel to a direction of an applied load. A plurality of corrugated protective edge members is positioned against, and attached to, each opposing wide face of the reinforced support mat, and a resilient belting corner member is mounted to opposing wide face of the reinforced support mat adjacent the longitudinal ends of the corrugated protective edge members. A plurality of rigid fasteners extending through and connecting pairs of the corrugated protective edge members on opposite sides of the reinforced support mat, and an inboard ends of pairs of the resilient edge members, to the wide faces of the support mat. A lag bolt attaches an outboard end of each resilient belting corner member to a wide face of the support mat.

In another embodiment an array of reinforced support mats includes a plurality of reinforced support mats, each reinforced support mat having a plurality of billets fastened together, each billet comprising a plurality of vertically oriented individual wood members adhesively bonded to each other, each of the individual wood members having wide faces oriented parallel to a direction of a load applied to the reinforced support mat, each billet having outboard wood members, the reinforced support mat having outboard billets, the outwardly facing wide faces of the outboard wood members of each billet defining a wide face of the billet, a wide face of each outboard billet defining a wide face of the reinforced support mat. A plurality of corrugated protective edge members is positioned against each of the opposing wide faces of the reinforced support mat. A resilient belting corner member is mounted to the opposing wide faces of the reinforced support mat adjacent the longitudinal ends of the plurality of corrugated protective edge members at the longitudinal ends of the reinforces support mat. A plurality of rigid fasteners extends through and connect pairs of the corrugated protective edge members on opposite sides of the reinforced support mat, and inboard ends of pairs of the resilient edge members on opposite sides of the reinforced support mat, to the wide faces of the support mat. A lag bolt attaches an outboard end of each resilient belting corner member to a wide face of the support mat. Adjacent ones of the plurality of reinforced support mats are positioned side by side such that the corrugations of the corrugated protective edge members are nested, and wherein the resilient belting corner members of longitudinally adjacent ones of the plurality of reinforced support mats are adjacent each other.

Other advantages of the support mat will become apparent to those skilled in the art from the following detailed description, when read in view of the accompanying drawings.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
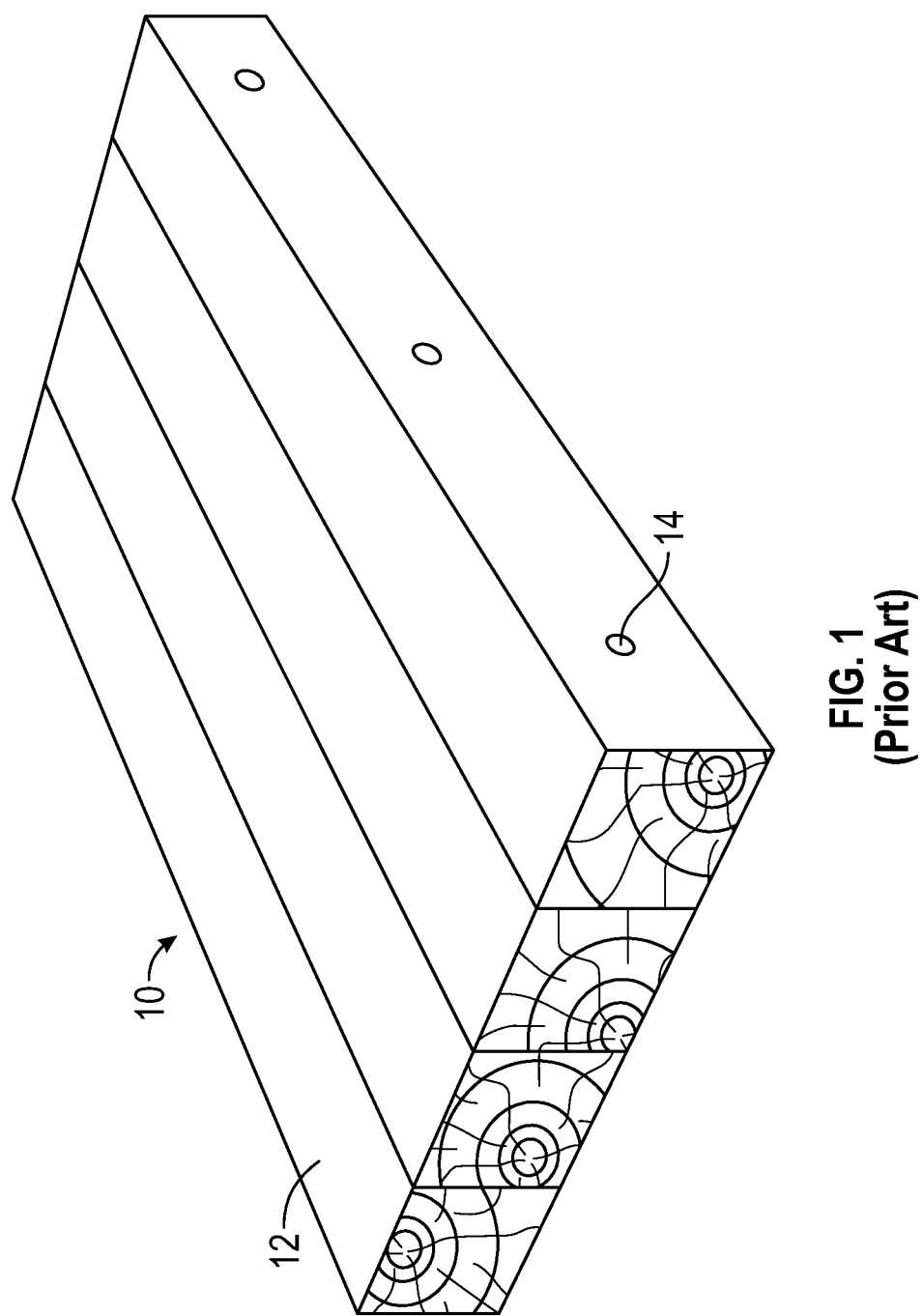
FIG. 1 is a side perspective view of a known panel formed of solid sawn timber.
Figure 2:
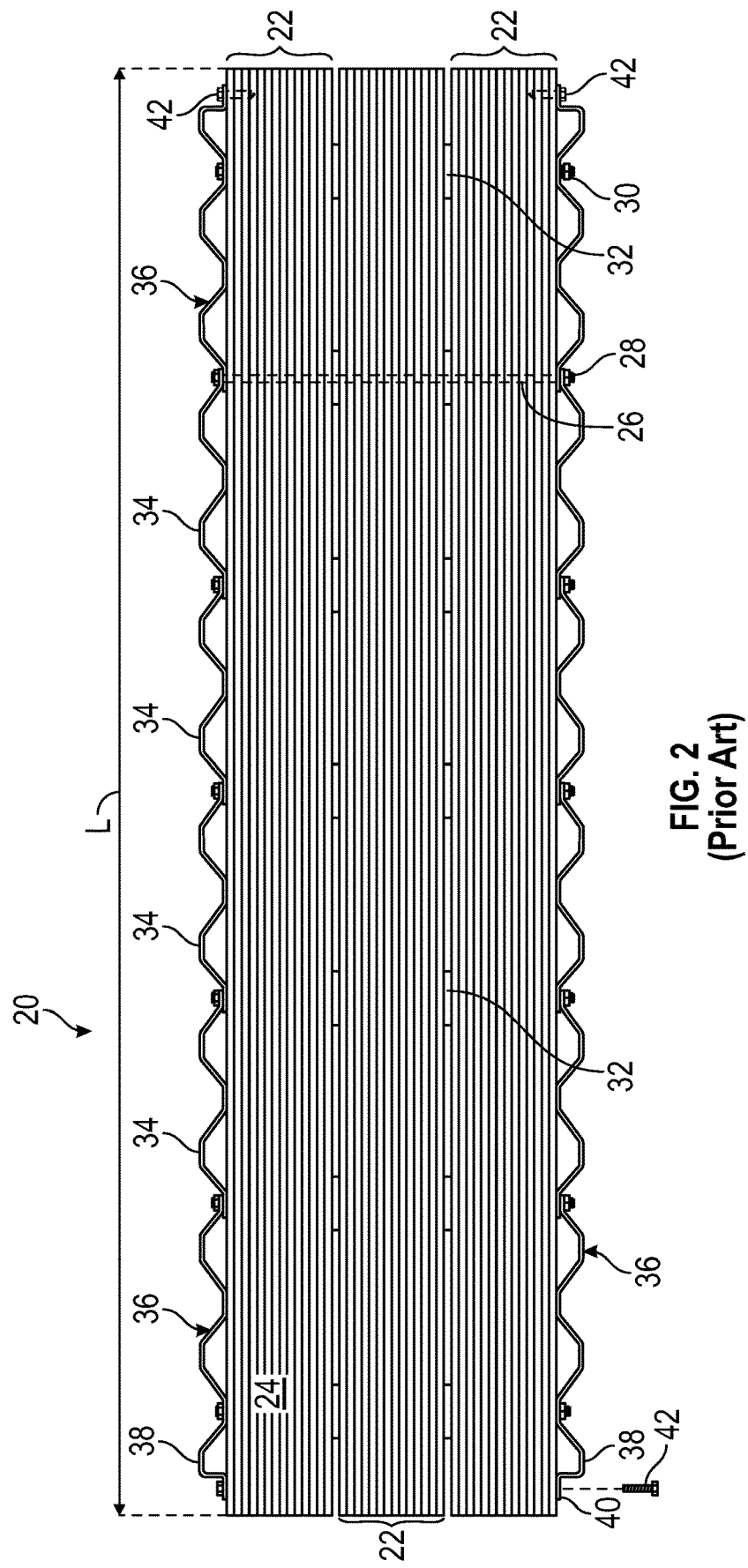
FIG. 2 is a top plan view of a known reinforced laminated support panel.
Figure 3:
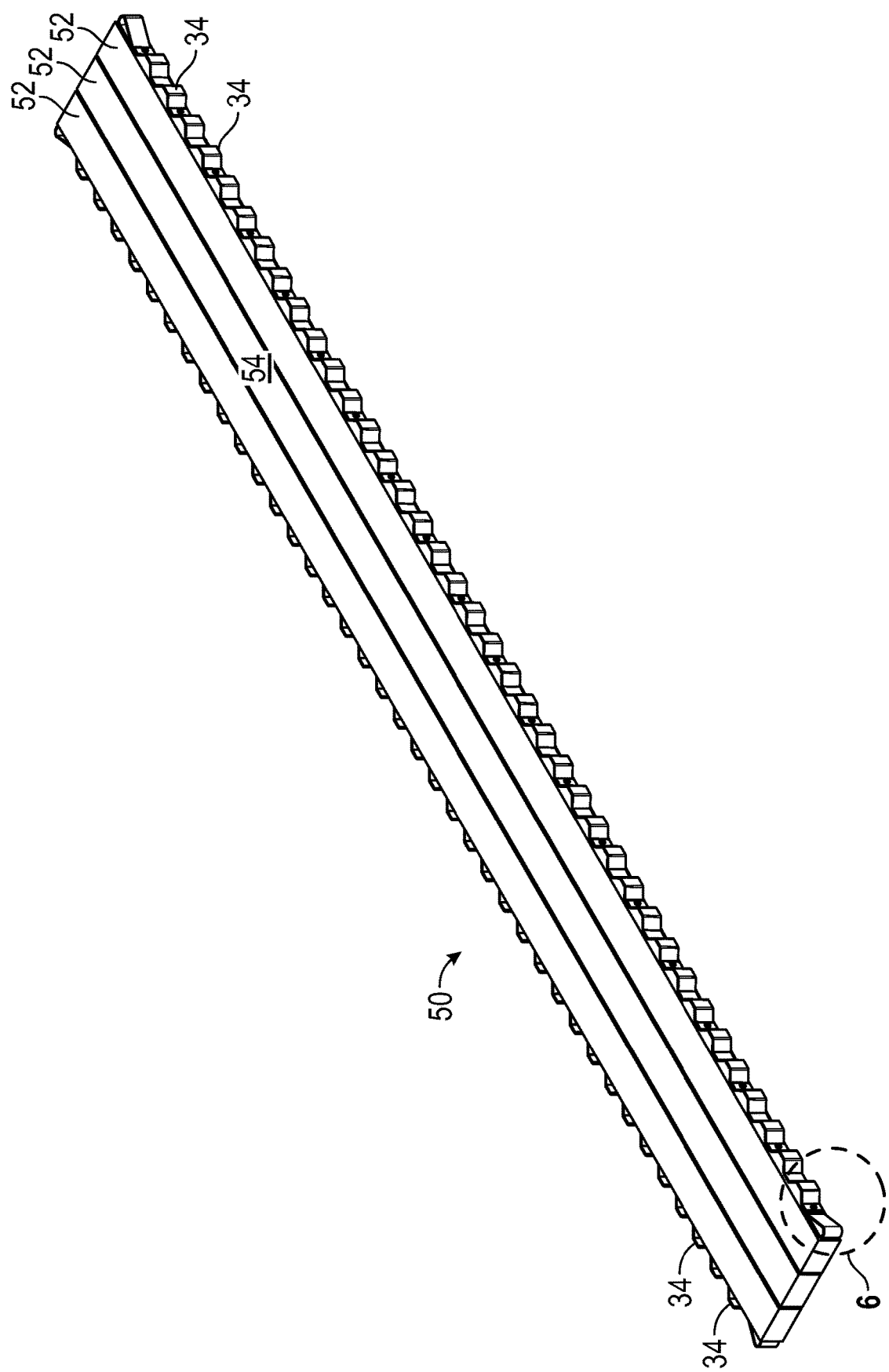
FIG. 3 is a perspective view of a reinforced laminated support mat in accordance with this invention.
Figure 4:
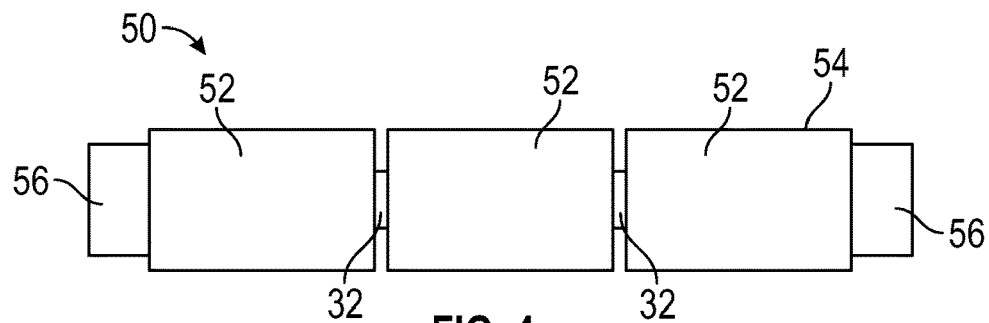
FIG. 4 is a side elevational view of the reinforced laminated support mat shown in FIG. 3.

FIG. 2 illustrates a known reinforced laminated support mat 20. The illustrated reinforced laminated support mat 20 is comprised of a plurality of laminated beams or billets 22, has a substantially planar wide or load-bearing face 24, and a length L of about 14 ft. It will be understood however, that the reinforced laminated support mat 20 may have any other desired length.

Each of the illustrated billets 22 comprises a plurality of wood members or individual wood laminations. Apertures 26 may be formed through the reinforced laminated support mat 20 for receiving fastening means, such as substantially rigid fasteners or threaded steel rods 28 attached with nuts 30.

In the illustrated embodiment, a plurality of resilient spacers 32 are shown disposed within the space between adjacent billets 22. It will be understood that any number of resilient spacers 32 may be disposed within the space between adjacent billets 22. The resilient spacers 32 may be formed from any desired material having the properties of good mechanical strength, high ozone and weather resistance, good aging resistance, low flammability, good resistance toward chemicals, moderate oil and fuel resistance, and adhesion to many substrates, such as for example rubber and styrene-butadiene rubber (SBR).

As used in the description of the invention, the term "mat" includes mats as well as panels. Examples of such a support mat are described in co-assigned U.S. Pat. Nos. 7,137,236 and 7,818,929, herein incorporated by reference in their entirety.

The reinforced laminated support mat 20 includes a plurality of elongated, protective edge members 34 and 36. Each illustrated protective edge member 34 is formed of steel having a corrugated shape. The corrugated protective edge members 34 include apertures through which the steel rods 28 extend for attachment to the reinforced laminated support mat 20. The corrugated protective edge members 36 are similar to the corrugated protective edge members 34, however distal ends of the corrugated protective edge members 36 positioned at the distal ends of the reinforced laminated support mat 20 include a corrugated section 38 having a width about ½ the width of the other corrugated sections in the corrugated protective edge members 36, and in the corrugated protective edge members 34. The corrugated section 38 includes an attachment flange 40 having an aperture formed therethrough. A lag bolt 42 extends through the aperture in the attachment flange 40 and into the billet 22 of the reinforced laminated support mat 20.

When two or more of the reinforced laminated support mats 20 are used together in the field, they are typically positioned side by side such that the corrugations of the corrugated protective edge members 34 and 36 are nested. However, the distal ends of the corrugated protective edge members 36 positioned at the distal ends of the reinforced laminated support mat 20 are attached only with the lag bolt 42. Therefore, the corrugated protective edge members 36, especially the corrugated section 38 may become bent or otherwise deformed, for example when the corrugated protective edge members 36 overlaps a corrugated protective edge member 34 or 36 of an adjacent reinforced laminated support mat 20 and is driven upon by a vehicle or other equipment. Such a bent or deformed corrugated protective edge member 36 may cause damage to a vehicle or other equipment driven thereon.

Referring now to FIGS. 3 through 8, a first embodiment of an improved reinforced laminated support mat is indicated generally at 50. The illustrated reinforced laminated support mat 50 is comprised of a plurality of laminated beams or billets 52 and has a substantially planar wide or load-bearing face 54.

The illustrated billets 52 are substantially the same as the billets 22, and will not be described further in detail. Apertures 55 may be formed through the reinforced laminated support mat 50 for receiving fastening means, such as the threaded steel rods 28 attached with the nuts 30.

In the illustrated embodiment, a plurality of the resilient spacers 32 are shown disposed within the space between adjacent billets 52. It will be understood that any number of resilient spacers 32 may be disposed within the space between adjacent billets 52. The illustrated reinforced laminated support mat 50 has a length of about 40 ft, a width of about 4 ft and a thickness of about 7.5 inches. It will be understood that the within the range of from about 12 feet to about 60 feet. It will be understood however, that the reinforced laminated support mat 50 may be constructed have other desired dimensions.

The reinforced laminated support mat 50 does not include the corrugated protective edge members 36. Rather, the reinforced laminated support mat 50 uses only a plurality of the corrugated protective edge members 34 and a resilient belting corner member 56 at the distal ends of the reinforced laminated support mat 50.

Figure 5:
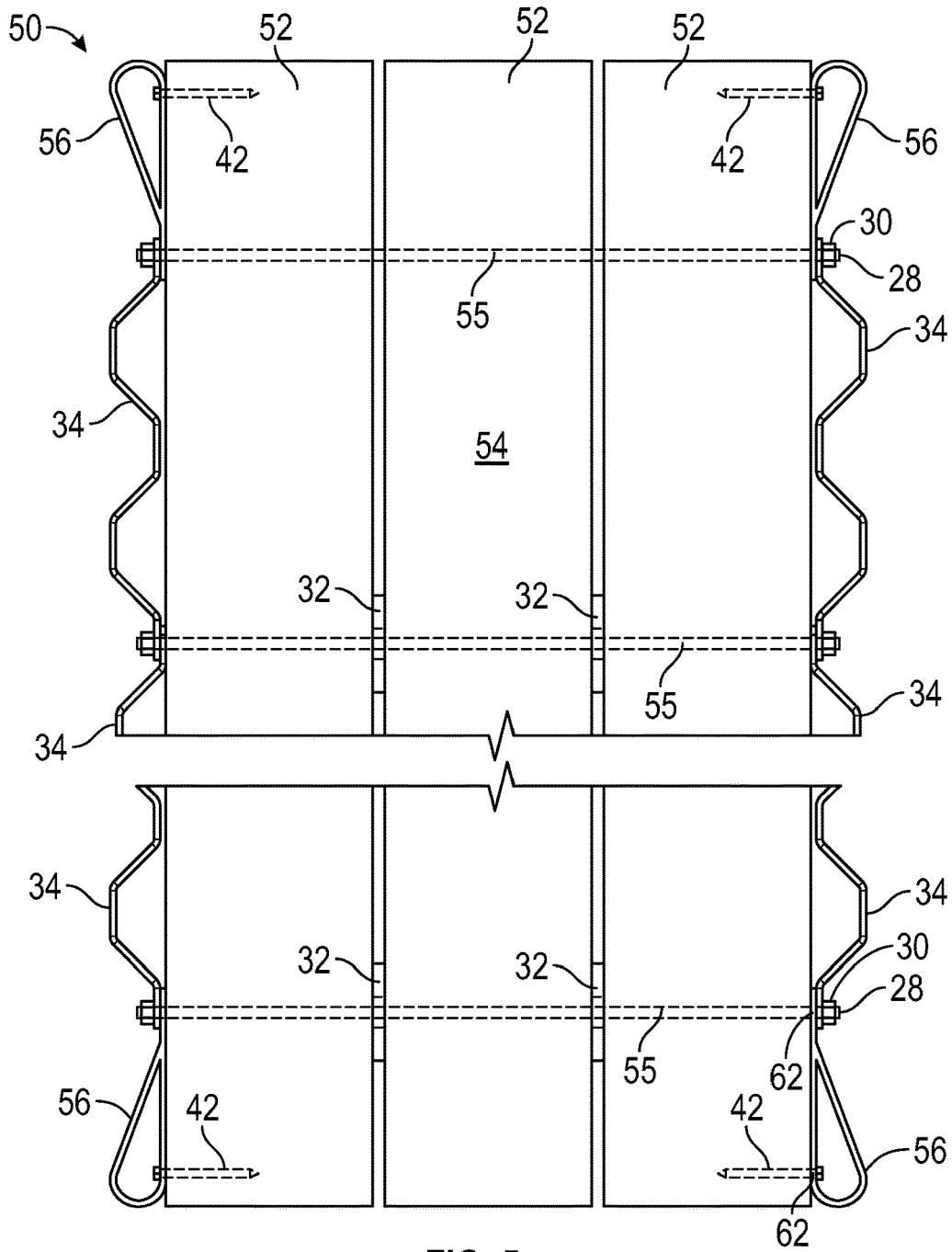
FIG. 5 is a top plan view of the reinforced laminated support mat shown in FIG. 3.
Figure 6:
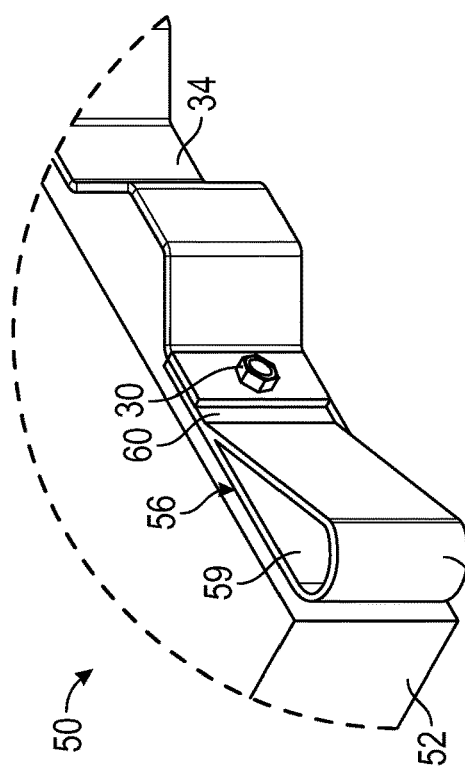
FIG. 6 is an enlarged perspective view of the portion of the laminated support mat shown in circle 5 of FIG. 3.

Each resilient belting corner member 56 includes a body 58 having a tear drop shaped cross-section defining an open space 59 and an attachment flange 60. Apertures 62 are formed through each of a wall of the body 58 and the attachment flange 60. As shown in FIGS. 5 and 6, one of the steel rods 28 extends through the aperture 62 in the attachment flange 60, and though an adjacent corrugated protective edge members 34 for attachment to the reinforced laminated support mat 50. A lag bolt 42 extends through the aperture 62 in the wall of the body 58, and into the reinforced laminated support mat 50 for attachment thereto. The illustrated resilient belting corner member 56 is formed from reinforced SBR. The SBR may be reinforced with any conventional material, such as commercially available coated fabric. If desired, the resilient belting corner member 56 may be formed from other material, such as for example rubber, polypropylene, polyethylene, or other similar polymers.

Figure 7:
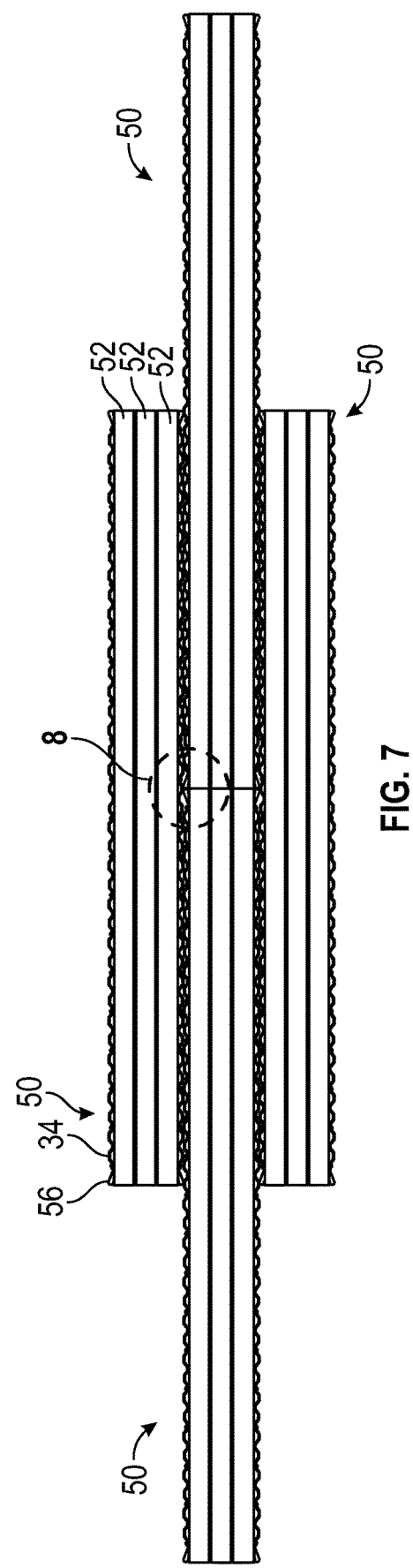
FIG. 7 is a top plan view of a plurality of the reinforced laminated support mats shown illustrated in FIG. 3, shown positioned for use in a field environment.
Figure 8:
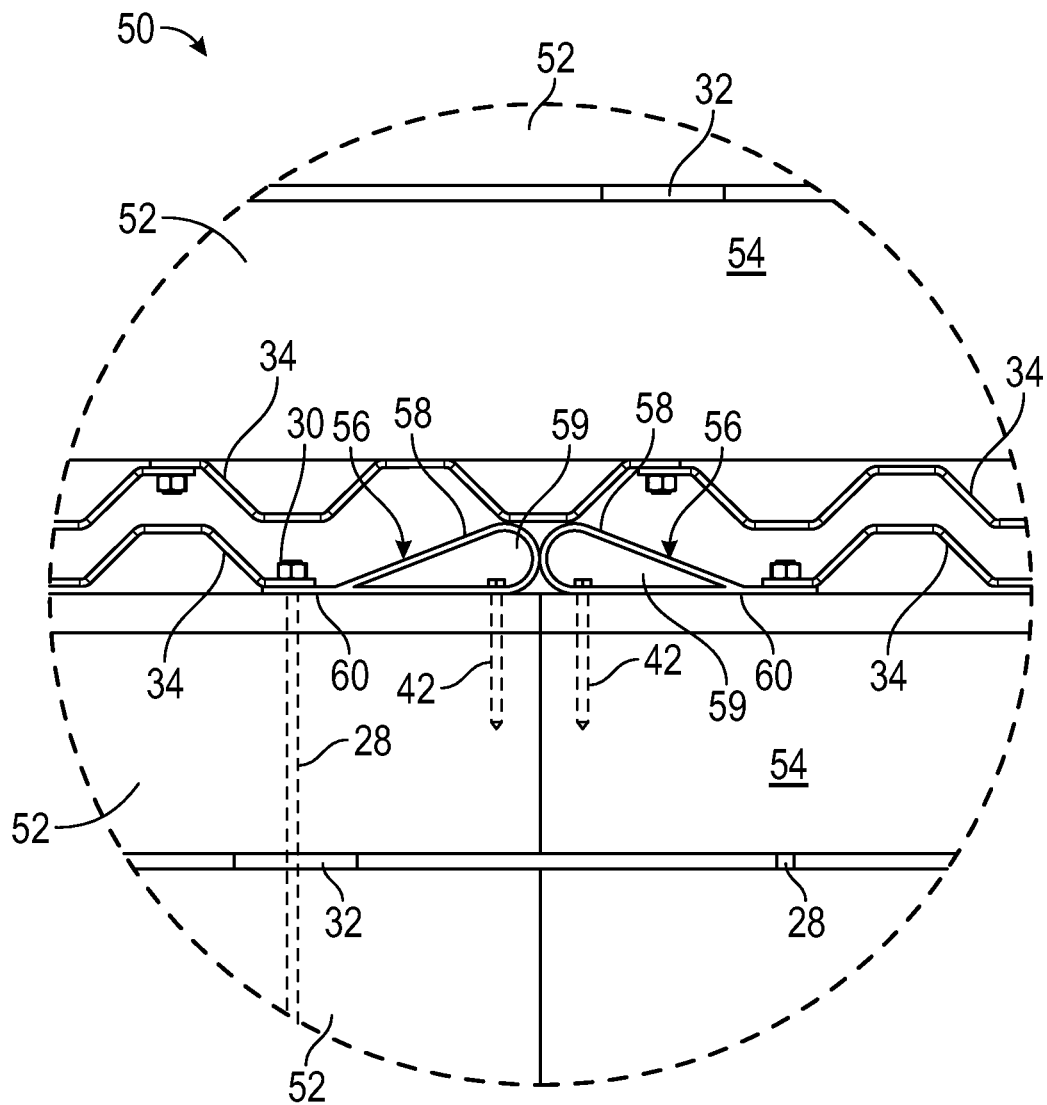
FIG. 8 is an enlarged perspective view of the portion of the plurality of reinforced laminated support mats shown in circle 8 of FIG. 7.

As discussed above, when two or more of the reinforced laminated support mats 50 are used together in the field, they are typically positioned side by side such that the corrugations of the corrugated protective edge members 34 are nested, as shown in FIGS. 7 and 8.

Advantageously, and unlike the reinforced laminated support mats 20, the resilient belting corner members 56 are attached at the distal ends of the of the reinforced laminated support mat 50, rather than the steel corrugated protective edge members 36. If the SBR belting corner members 56 are positioned such that they overlap any portion of an adjacent reinforced laminated support mat 50, the SBR belting corner members 56 bend or flex, when driven upon by a vehicle or other equipment.

The addition of the SBR belting corner members 56 to the longitudinal ends of the corrugated protective edge members 34 allows for deflection without permanent deformation of the corrugated protective edge members 34 that might otherwise result from inadvertent overlap of adjacent reinforced laminated support mats 50. Additionally, as shown in FIG. 8, the SBR belting corner members 56 fill what would otherwise be a void between the distal ends of the corrugated protective edge members 34 of longitudinally adjacent reinforced laminated support mats 50, thus also mitigating a trip hazard caused by such a void.

The principle and mode of operation of the laminated support mat and its method of manufacture have been described in its various embodiments. However, it should be noted that the laminated support mat and its method of manufacture described herein may be practiced otherwise than as specifically illustrated and described without departing from its scope.

What is claimed is:

1. A reinforced support mat comprising:
   a plurality of vertically oriented individual wood members adhesively bonded to each other, each of the individual wood members having wide faces oriented parallel to a direction of a load applied to the reinforced support mat, the support mat having outboard wood members, the outwardly facing wide faces of the outboard wood members defining opposing wide faces of the reinforced support mat;
   a plurality of corrugated protective edge members positioned against each of the opposing wide faces of the reinforced support mat;
   a resilient belting corner member mounted to the opposing wide faces of the reinforced support mat adjacent the longitudinal ends of the plurality of corrugated protective edge members at the longitudinal ends of the reinforced support mat;
   wherein the resilient belting corner member comprises a body having a tear drop shaped cross-section defining an open space and an attachment flange; and
   wherein apertures are formed through each of a wall of the body and the attachment flange;
   a plurality of rigid fasteners extending through and connecting pairs of the corrugated protective edge members on opposite sides of the reinforced support mat, and inboard ends of pairs of the resilient edge members on opposite sides of the reinforced support mat, to the wide faces of the support mat; and
   a lag bolt attaching an outboard end of each resilient belting corner member to a wide face of the support mat.

2. The reinforced support mat according to claim 1, wherein the resilient belting corner member is formed from one of rubber and styrene-butadiene rubber (SBR).

3. The reinforced support mat according to claim 1, wherein a portion of the plurality of vertically oriented individual wood members define a billet, the support mat having a plurality of billets, each billet having outboard wood members; wherein outwardly facing wide faces of the outboard wood members of each billet define a wide face of the billet; and
   wherein a resilient spacer is disposed between the wide faces of adjacent billets, the resilient spacer permitting the asymmetrical expansion of the billets.

4. The reinforced support mat according to claim 3, wherein the resilient spacer is formed from one of rubber and styrene-butadiene rubber (SBR).

5. An array of reinforced support mats comprising:
   a plurality of reinforced support mats, each reinforced support mat having:
      a plurality of billets fastened together, each billet comprising a plurality of vertically oriented individual wood members adhesively bonded to each other, each of the individual wood members having wide faces oriented parallel to a direction of a load applied to the reinforced support mat, each billet having outboard wood members, the reinforced support mat having outboard billets, the outwardly facing wide faces of the outboard wood members of each billet defining a wide face of the billet, a wide face of each outboard billet defining a wide face of the reinforced support mat;
      a plurality of corrugated protective edge members positioned against each of the opposing wide faces of the reinforced support mat;
      a resilient belting corner member mounted to the opposing wide faces of the reinforced support mat adjacent the longitudinal ends of the plurality of corrugated protective edge members at the longitudinal ends of the reinforced support mat;
      wherein the resilient belting corner member comprises a body having a tear drop shaped cross-section defining an open space and an attachment flange; and
      wherein apertures are formed through each of a wall of the body and the attachment flange;
      a plurality of rigid fasteners extending through and connecting pairs of the corrugated protective edge members on opposite sides of the reinforced support mat, and inboard ends of pairs of the resilient edge members on opposite sides of the reinforced support mat, to the wide faces of the support mat; and
      a lag bolt attaching an outboard end of each resilient belting corner member to a wide face of the support mat;
   wherein adjacent ones of the plurality of reinforced support mats are positioned side by side such that the corrugations of the corrugated protective edge members are nested, and
   wherein the resilient belting corner members of longitudinally adjacent ones of the plurality of reinforced support mats are adjacent each other.

6. The array of reinforced support mats according to claim 5, wherein the resilient belting corner member is formed from one of rubber and styrene-butadiene rubber (SBR).

7. The array of reinforced support mats according to claim 5, wherein a resilient spacer is disposed between the wide faces of adjacent billets, the resilient spacer permitting the asymmetrical expansion of the billets.

8. The array of reinforced support mats according to claim 7, wherein the resilient spacer is formed from one of rubber and styrene-butadiene rubber (SBR).

\* \* \* \* \*